(12) United States Patent
Van Mourik (10) Patent No.: US 11,479,093 B2
(45) Date of Patent: Oct. 25, 2022

(54) METHOD AND DEVICE FOR ACCURATE POSITIONING OF A MOVEABLY ARRANGED PANEL

(71) Applicant: Inalfa Roof Systems Group B.V., Oostrum (NL)

(72) Inventor: Marco Van Mourik, Oostrum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 591 days.

(21) Appl. No.: 16/673,399

(22) Filed: Nov. 4, 2019

(65) Prior Publication Data

US 2020/0139797 A1    May 7, 2020

(30) Foreign Application Priority Data

Nov. 7, 2018  (EP) ..................................... 18205017

(51) Int. Cl.

| | |
|---|---|
| *B60J 7/00* | (2006.01) |
| *B60J 7/057* | (2006.01) |
| *E05F 15/659* | (2015.01) |
| *B60J 7/043* | (2006.01) |
| *G05D 3/12* | (2006.01) |

(52) U.S. Cl.
CPC .............. *B60J 7/0573* (2013.01); *B60J 7/043* (2013.01); *E05F 15/659* (2015.01); *G05D 3/125* (2013.01); *E05Y 2400/354* (2013.01); *E05Y 2900/542* (2013.01)

(58) Field of Classification Search
CPC ........ B60J 7/0573; B60J 7/043; E05F 15/659; G05D 3/125; E05Y 2400/354; E05Y 2900/542

USPC ............................................. 701/49; 454/129
See application file for complete search history.

(56) References Cited

U.S. PATENT DOCUMENTS

| | | | |
|---|---|---|---|
| 6,114,822 A | 9/2000 | Ubelein et al. | |
| 9,632,510 B2 | 4/2017 | Scholz | |
| 9,812,997 B2* | 11/2017 | Kojima | .................... E05F 15/40 |
| 2002/0152013 A1 | 10/2002 | Knab et al. | |
| 2007/0107313 A1* | 5/2007 | Suzuki | ..................... E05F 15/41 |
| | | | 49/506 |

(Continued)

FOREIGN PATENT DOCUMENTS

| | | |
|---|---|---|
| DE | 10026991 A1 | 12/2001 |
| DE | 102012024902 A1 | 6/2014 |

(Continued)

OTHER PUBLICATIONS

European Search Report for corresponding European Patent Application No. 18205017.9, filed Nov. 7, 2018.

*Primary Examiner* — Tyler J Lee
*Assistant Examiner* — Tiffany P Ohman
(74) *Attorney, Agent, or Firm* — Steven M. Koehler; Westman, Champlin & Koehler, P.A.

(57) ABSTRACT

A method for positioning a movably arranged panel comprises the steps of determining a panel braking distance based on a physical property of the moveable panel and a physical property of at least one of a drive assembly and a drive motor. The panel braking distance corresponds to a distance covered by the moveable panel in a period of time starting from a decision to switch off the drive motor until stand-still of the moveable panel. The drive motor is switched off when an expected stop position is within a predetermined range around a desired stop position.

20 Claims, 4 Drawing Sheets

(56) References Cited

U.S. PATENT DOCUMENTS

| | | | |
|---|---|---|---|
| 2009/0051192 A1* | 2/2009 | Ewing | E05C 17/006 296/146.4 |
| 2014/0365080 A1* | 12/2014 | Hirota | E05F 15/632 701/49 |
| 2015/0057895 A1* | 2/2015 | Yamada | E05F 15/70 701/49 |
| 2016/0077528 A1 | 3/2016 | Scholz | |

FOREIGN PATENT DOCUMENTS

| | | |
|---|---|---|
| JP | 2009262930 A | 11/2009 |
| WO | 9808148 A1 | 2/1998 |

* cited by examiner

METHOD AND DEVICE FOR ACCURATE POSITIONING OF A MOVEABLY ARRANGED PANEL

BACKGROUND

The discussion below is merely provided for general background information and is not intended to be used as an aid in determining the scope of the claimed subject matter.

The present invention pertains to a method for positioning a movably arranged panel, to a sunroof panel assembly configured to perform such method and to a computer readable medium carrying computer readable instructions for instructing a computer to perform such method.

It is common to have a vehicle having a sunroof or a similar panel. Such a panel may be a fixed panel, but the panel may as well be tiltable to a tilt position for ventilation and/or may be slidable to provide for a relatively large opening in a roof of the vehicle.

Such moveably arranged panels need to be controllable to be moved to a predetermined position. For example, the moveable panel should be moveable to a closed position. In the closed position, the moveable panel should be water tight to prevent leakage of rain water, for example. Further, the moveable panel is preferably accurately positionable for aesthetic reasons or aerodynamic reasons. Further, e.g. upon closing, it may be preferred to have no noise, like clicking or ticking sounds due to hardware elements colliding, as such sounds are usually not appreciated by users of the vehicle. Similar considerations may apply to moving the moveable panel to any other position.

When the vehicle is not moving, accurately positioning the moveable panel may be relatively straightforward. However, the moveable panel may be operated under many other conditions. First of all, while driving, aerodynamic air flows are generated around the vehicle. Consequently, the moveable panel may be operated under different air pressures. Moreover, the air pressure may even differ over a trajectory to be travelled by the moveable panel. For example, when moving from an open position, wherein air may flow into the interior of the vehicle, to a closed position, wherein no air can flow into the interior, the air flow and corresponding air pressure on the moveable panel may change during closing operation. Other conditions may affect the moving operation of the moveable panel as well. For example, road conditions, weather conditions, wear over the lifetime of the moveable panel and many other conditions may affect the way the moveable panel moves.

In order to control the movement of a moveable panel, it is known to apply a control unit that operates a drive motor that drives the moveable panel. However, it is known that the moveable panel may continue to move, when a drive current to the drive motor is switched off due to inertia of the moveable panel. Therefore, in a known moveable panel assembly, the control unit may switch off the drive motor prematurely such that the inertia may move the moveable panel to the desired position. Then, as soon as the moveable panel has come to standstill, the position of the moveable panel is compared to the desired position and if the moveable panel is not within a predetermined range of the desired position, the control unit corrects the position by operating the drive motor again. Such an iterative control loop for final positioning is undesirable as it may prove difficult to control the moveable panel to move only slightly in view of e.g. static friction or play in the mechanical assembly. Moreover, a moveable panel that repeatedly moves before coming to its final position may not be appreciated by users.

A moveable panel assembly wherein the moveable panel is accurately positionable under most, if not all, relevant conditions would be beneficial.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect of the present invention, a method controls movement of a movable panel, wherein the moveable panel is operatively coupled through a drive assembly to a drive motor for moving the moveable panel. The method includes actuating the drive motor to move the moveable panel to a desired stop position; determining a panel braking distance based on a physical property of the moveable panel and a physical property of at least one of the drive assembly and the drive motor, wherein the panel braking distance corresponds to a distance covered by the moveable panel in a period of time starting from a decision to switch off the drive motor until stand-still of the moveable panel; determining an actual position of the moveable panel; determining an expected stop position by adding the panel braking distance and the present position; and switching off the drive motor if the expected stop position is within a predetermined range around the desired stop position and repeating the above steps of determining a panel braking distance, determining an actual position and determining an expected stop position, if the expected stop position is outside said predetermined range.

In further embodiments of the method, the panel braking distance is repeatedly determined on the basis of instant conditions and properties. In particular, the panel braking distance may be determined on the basis of at least one physical property of the moveable panel, such as its weight or speed, and at least one physical property of at least one of the drive assembly and the drive motor. For example, friction in the drive assembly or friction in the drive motor may be used. Most of such physical properties are variable depending on the conditions. For example, friction is dependent on temperature, position of the moveable panel, age of the moveable panel (wear) and other conditions. In further embodiments, at least some, and maybe preferably all, of the physical properties used for determining the panel braking distance are determined instantly such to determine an instant panel braking distance.

Based on the instant panel braking distance, an expected stop position can be determined. The expected stop position is the position where the moveable panel would come to standstill, if the drive motor would be switched off at that moment. If the expected stop position is not within a predetermined range around the desired stop position, the method returns to determining the panel break distance again. If the expected stop position is within said predetermined range, the method continues with switching off the drive motor. Thus, the method is sufficiently accurate to reliably stop the moveable panel at or sufficiently near the desired stop position such that no further correction of the final stop position is needed.

In an embodiment, the step of determining the panel braking distance comprises a step of determining a speed of movement of the moveable panel and further comprises at least one of the steps of determining a mechanical braking distance based on said speed, wherein the mechanical braking distance corresponds to a distance travelled by the moveable panel after removing a drive current to the drive motor; and determining a control delay induced braking distance based on said speed, wherein the control delay induced distance corresponds to a distance travelled by the moveable panel in a processing period between a decision of a control unit to switch off the drive motor and actual removal of the drive current to the drive motor. It has been found that the panel braking distance may comprise multiple aspects. First, a part of the panel braking distance is caused by mechanical aspects, which is primarily due to inertia of the moveable panel. With a higher speed, a distance travelled due to inertia is larger. Second, controlling the drive motor requires a certain processing period. So, between a moment of taking a decision of a control unit to switch off the drive motor and a moment at which a drive current to the drive motor is actually switched off a control delay induced braking distance is travelled by the moveable panel, which distance is dependent on the actual speed of the moveable panel.

In a particular embodiment, the method is performed by a control unit and the processing period comprises a predetermined processing delay in the control unit. The control unit requires a certain software processing time to perform the required operations.

In a further particular embodiment, the drive current is removed by operating a relay and wherein the processing period comprises a predetermined processing delay for switching the relay. The relay requires a certain amount of time to switch, during which time the moveable panel travels a certain distance.

In a particular embodiment, an instant panel friction value is determined for determining the mechanical braking distance, wherein said panel friction value corresponds to friction in the drive assembly. As mentioned above, friction is dependent on the conditions and is a significant contributor to the resulting mechanical braking distance. Determining the instant panel friction value significantly improves the accuracy of the estimation of the panel braking distance.

In a particular embodiment, the step of determining the mechanical braking distance comprises taking into account a motor friction value, wherein the motor friction value corresponds to friction induced by the drive motor when no drive current is supplied to the drive motor. Similar to the friction in the drive assembly, the drive motor may exert a significant friction force, when the drive motor is not provided with a drive current. Taking this friction force into account improves the accuracy of the estimation of the panel braking distance.

In an embodiment of the method according to the present invention, the moveable panel is slidable between a first position and a second position, e.g. between a closed position and an open position, wherein the panel braking distance is calculated taking into account an actual slide speed.

In an embodiment of the method according to the present invention, the moveable panel is moveable to a tilt position, wherein the panel braking distance is calculated taking into account an actual tilting speed.

Known moveable panels may be slidable or tiltable or both. The direction of movement of the moveable panel is relevant for determining the inertia-induced mechanical braking distance. Moreover, while the sliding movement may be expected to be substantially perpendicular to a direction of gravity, the tilting movement may be expected to be parallel to a direction of gravity. Therefore, when the moveable panel is in an upward tilting movement, gravity may reduce an inertia-induced braking distance, while in a downward tilting movement, gravity may increase an inertia-induced braking distance. Such effects may be taken into account when determining the panel braking distance.

In an embodiment of the method according to the present invention, a control loop time corresponds to a period of time for performing the steps for determining the panel braking distance, the actual position and the expected stop position. In this embodiment, the method comprises a further step performed prior to step e. Said further step comprises determining said predetermined range based on the control loop time and the actual speed of the moveable panel. Depending on the control loop time, the predetermined range may be determined to be larger or smaller.

In a particular embodiment, the predetermined range extends between a first range end position and a second range end position and the first range end position is determined based on the control loop time and the actual speed of the moveable panel and the second range end position corresponds to the desired stop position. Further, the last step of the method, i.e. switching off the drive motor or repeating previous steps, comprises determining a timing for switching off the drive motor if the expected stop position is within the predetermined range. In this embodiment, if the expected stop position is within the predetermined range, the actual moment of switching off the drive motor is selected such that the expected stop position is as close as possible to the desired stop position. Thereto, the predetermined range does not extend beyond the desired stop position and, further, the drive motor is not automatically switched off immediately, but a suitable timing is determined, wherein such timing corresponds as closely as possible to a position of the moveable panel at which position the moveable panel is at the panel braking distance from the desired stop position. Thus, switching off the drive motor at that moment of time, it is expected that the moveable panel comes to standstill exactly at the desired stop position.

In a second aspect, the present invention provides a moveable panel assembly comprising a moveably arranged panel, a drive motor operatively coupled to the moveable panel for moving the moveable panel and a control unit operatively coupled to the drive motor for operating the drive motor, wherein the control unit is configured for performing the method according to the present invention.

In a third aspect, the present invention provides a vehicle comprising the moveable panel assembly according to the present invention.

In a fourth aspect, the present invention provides a computer readable medium carrying computer readable instructions for instructing a computer, e.g. a control unit, to perform the method according to the present invention.

BRIEF DESCRIPTION OF THE DRAWINGS

Further scope of applicability of aspects of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

The present invention will now be described with reference to the accompanying drawings, wherein the same reference numerals have been used to identify the same or similar elements throughout the several views.

Figure 1A:
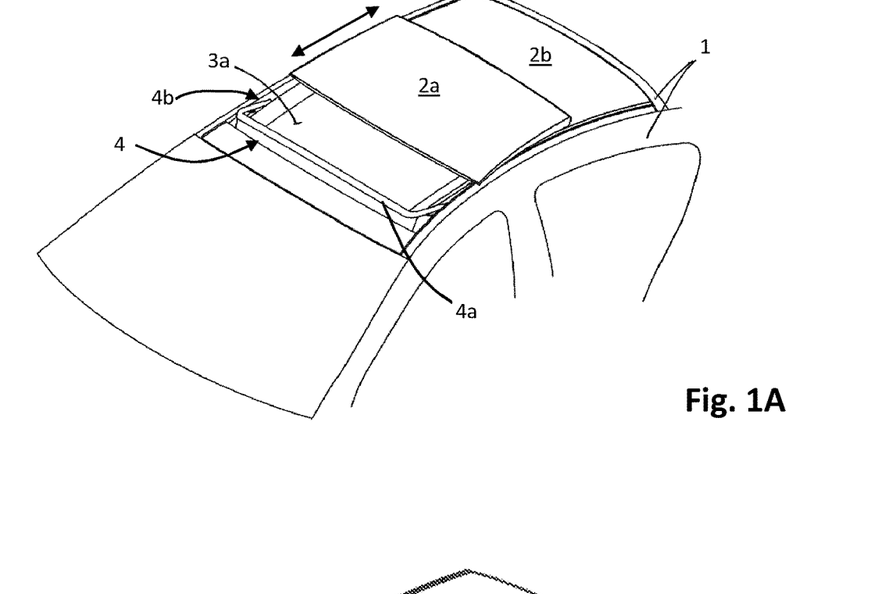
FIG. 1A shows a perspective view of a vehicle roof with a moveable panel.

FIG. 1A illustrates a vehicle roof 1 with a moveable panel 2a and a fixed panel 2b. The moveable panel 2a is moveable over a first roof opening 3a. A wind deflector 4 is arranged at a front side of the first roof opening 3a. It is noted that the illustrated vehicle roof 1 corresponds to a passenger car. The present invention is however not limited to passenger cars. Any other kind of vehicles having a moveable panel are contemplated as well.

Figure 1B:
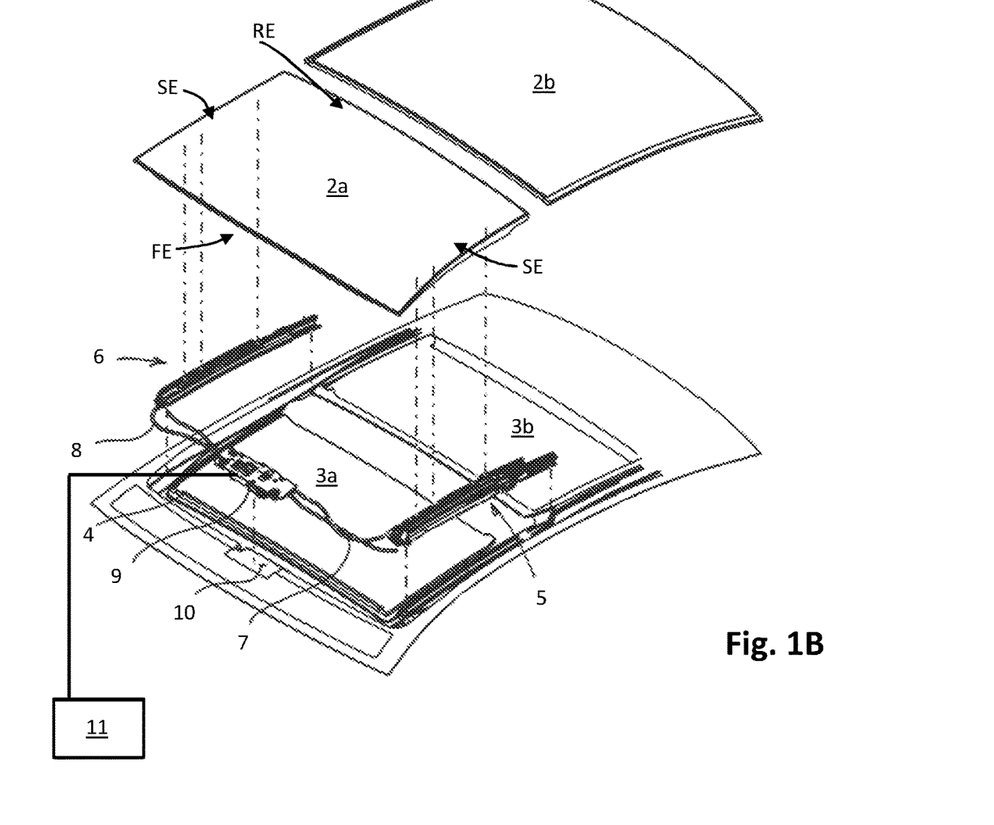
FIG. 1B shows an exploded view of the moveable panel of FIG. 1A.

FIG. 1B illustrates the same vehicle roof as FIG. 1A with panels 2a and 2b. Further, in this exploded view of FIG. 1B, it is shown that there is a second roof opening 3b. The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material.

The wind deflector 4 comprises commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the vehicle roof 1 at a hinge 4b. The wind deflector 4 is arranged in front of the first roof opening 3a and adapts air flow when the moveable panel 2a is in an open position, in particular in a position wherein the moveable panel 2a is slid open and the first roof opening 3a is exposed. In its raised position, the wind deflector 4 reduces inconvenient noise due to air flow during driving. When the moveable panel 2a is in a closed position, i.e. a position wherein the moveable panel 2a is arranged over and closes the first roof opening 3a and usually is arranged in a plane of the vehicle roof 1, or in a tilted position, i.e. a position wherein a rear end RE of the moveable panel 2a is raised as compared to the closed position, while a front end FE of the moveable panel 2a is still in the closed position, the wind deflector 4 is held down below the front end FE of the moveable panel 2a. Usually, the wind deflector 4 is raised by a spring force when the moveable panel 2a slides to an open position and the wind deflector 4 is pushed down by the moveable panel 2a when the moveable panel 2a slides back to its closed position. In FIG. 1A, the moveable panel 2a is shown in an open position and the wind deflector 4 is shown in a raised position. FIG. 1B is an exploded view of the moveable panel 2a in a closed position and the wind deflector 4 is correspondingly shown in a position in which it is held down.

FIG. 1B further illustrates a drive assembly having a first guide assembly 5, a second guide assembly 6, a first drive cable 7 and a second drive cable 8. Each guide assembly 5, 6 commonly comprises a guide and a mechanism, wherein the mechanism is slidably moveable in the guide. The first and second guide assemblies 5, 6 are arranged on respective side ends SE of the moveable panel 2a. The first and the second drive cables 7, 8 are provided between the respective guide assemblies 5, 6 and a drive motor 9.

The drive cables 7, 8 couple the drive motor 9 to the mechanism of the respective guide assemblies 5, 6 such that upon operating the drive motor 9, the mechanism of each guide assembly 5, 6 starts to move. In particular, a core of the drive cable 7, 8 is moved by the drive motor 9 such to push or pull on the mechanism of the respective guide assemblies 5, 6. Such a drive assembly is well known in the art and is therefore not further elucidated herein. Still, any other suitable drive assembly may be employed as well without departing from the scope of the present invention. Moreover, in a particular embodiment, a drive motor may be operatively coupled between the respective guides and mechanisms of the guide assemblies 5, 6 and the illustrated drive assembly with drive cables 7, 8 may then be omitted completely.

In the illustrated embodiment, the mechanisms of the guide assemblies 5, 6 may start to raise the rear end RE of the moveable panel 2a, thereby bringing the moveable panel 2a in the tilted position. Then, from the tilted position, the guide assemblies 5, 6 may start to slide to bring the moveable panel 2a in the open position. The present invention is not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit or controller 11 is schematically illustrated and operatively coupled to the drive motor 9. The control unit 11 may be any kind of processing unit, either a software controlled processing unit or a dedicated processing unit, like an ASIC, as well known to those skilled in the art. The control unit may be a stand-alone control unit or it may be operatively connected to another control unit, like a multi-purpose, generic vehicle control unit. In yet another embodiment, the control unit 11 may be embedded in or be part of such a vehicle control unit. Essentially, the control unit 11 may be embodied by any control unit suitable for, capable of and configured for performing an embodiment of the method according to the present invention.

For moving the moveable panel 2a between the different positions, in particular the closed position, the open position and/or the tilted position, the control unit 11 is adapted and configured to move the moveable panel 2a to such position and stop the moveable panel 2a at such a desired stop position. However, with different conditions, the moveable panel 2a may stop before or after the intended and desired stop position. If the desired stop position corresponds to the closed position, this may result in the moveable panel 2a not closing the roof opening 3a sufficiently, potentially resulting in rain leakage, for example, or the moveable panel 2a may not be level with e.g. the fixed panel 2b resulting in deteriorated aerodynamics and corresponding fuel usage. When moving to an open position or a tilted position, an overshoot in the desired position may result in elements of the guides 5, 6 may collide with each other or other parts resulting in collision sounds that are not appreciated by users. An undershoot in the desired position means that the moveable panel 2a is not fully opened, which is of course also not appreciated by a user. Therefore, the control unit 11 may be provided with a method to more accurately achieve that the moveable panel 2a stops at the desired position.

Figure 2:
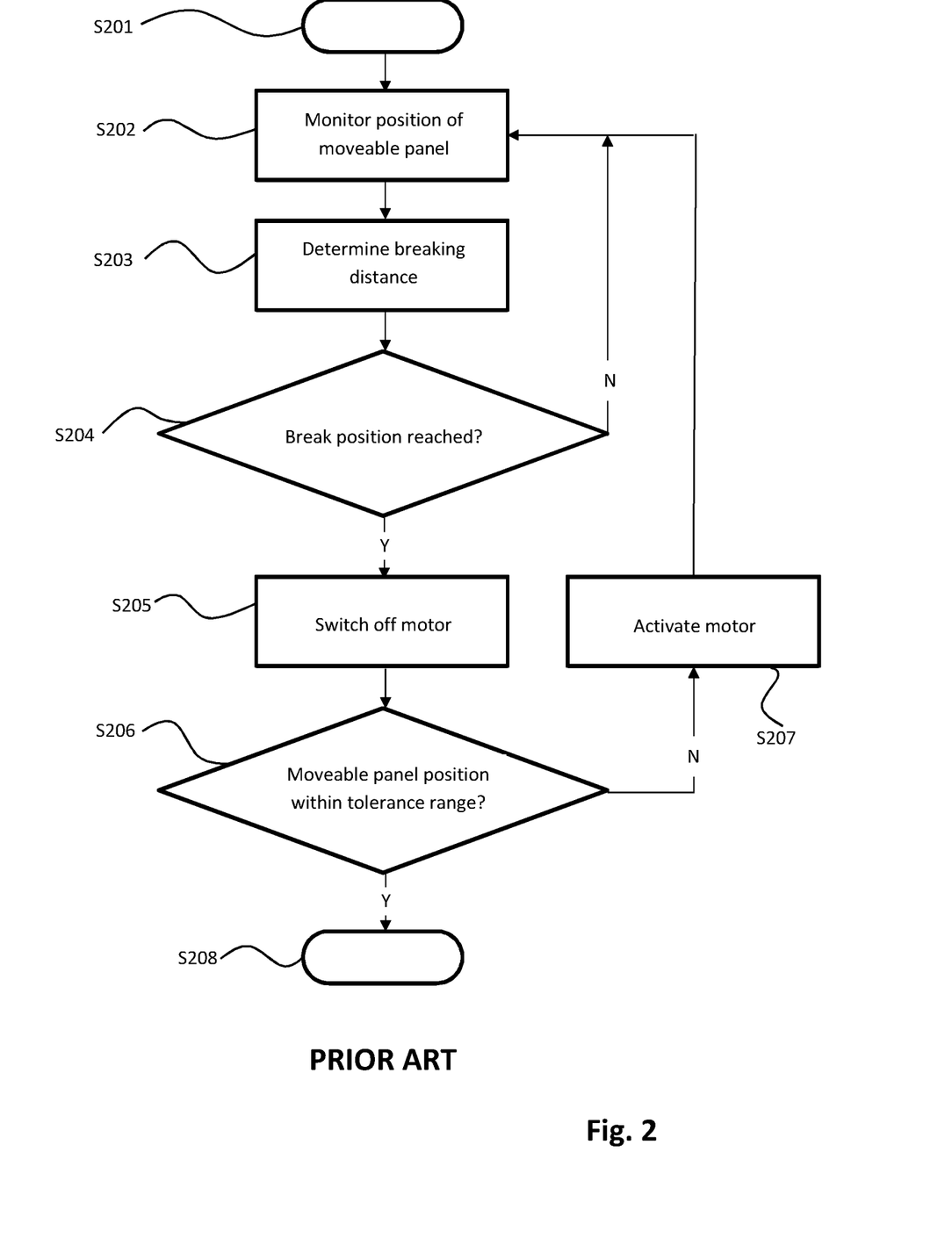
FIG. 2 shows a diagram illustrating a prior art control method for positioning a moveable panel.

In FIG. 2, a prior art method is illustrated, wherein the method is configured to achieve a more accurate positioning of the moveable panel. In particular, after a start S201 of a move towards a desired stop position, the control unit monitors the position of the moveable panel in step S202. The position may be monitored using suitable dedicated position measurement techniques and corresponding means. For example, an encoder may be applied or an ultrasonic technique may be applied. In a common embodiment, rotations of the drive motor are monitored and based on those rotations the position of the moveable panel is derived.

In step S203, a braking distance is determined. The braking distance is a distance that the moveable panel travels after the drive motor is switched off. For example, as known in the art, inertia will result in the moveable panel moving further before coming to a halt after the drive motor is switched off. In a prior art embodiment, the braking distance is determined by using the moveable panel weight and a moving speed of the moveable panel, wherein the speed may be an actual speed or an intended speed. Presuming a constant break force, a simple inertia calculation is used to determine the braking distance. In another prior art embodiment, a braking distance is determined in an initial calibration method, e.g. directly after manufacturing or directly after mounting in the vehicle roof. Presuming a constant braking distance, the braking distance is stored as a static value and is retrieved from memory in step S203.

Subtracting the determined braking distance from the desired position provides for a break position, which is a position at which the drive motor may be switched off such that it is expected that the moveable panel comes to a halt at the desired stop position. So, in step S204, it is checked whether the moveable panel has reached the break position. If the moveable panel has not yet reached the break position, the method returns to step S202. Of course, depending on the embodiment of the step S203, step S203 may be repeated or not. In the illustrated prior art embodiment, the braking distance is determined again.

If it is determined in step S204 that the break position is reached, the drive motor is switched of in step S205. Then, in step S206, the actual stop position of the moveable panel is compared to the desired stop position. In particular, it may be verified whether a deviation from the desired stop position is within an accepted, predetermined tolerance range. Such tolerance range may be selected or determined on the basis of many different aspects as apparent to those skilled in the art. In any case, a small tolerance range may result in more corrective movements.

If the actual stop position is within the accepted tolerance range, the method ends at step S208. However, if the actual stop position is outside the accepted tolerance range, the method continues with step S207, wherein the drive motor is re-activated corresponding to a desired corrective movement and the method starts repeating steps S202—S206.

As mentioned above, in the prior art, it is presumed that there is a constant braking force on the moving moveable panel. However, the braking force may vary considerably. For example, the braking force exerted on the moveable panel may be expected to be considerably different when the moveable panel is sliding from the closed position and the wind deflector is pushing against the moveable panel in its direction of movement. On the other hand, in a movement towards the closed position, the wind deflector will push against the moveable panel in a direction opposite to the direction movement, thereby providing a significantly higher braking force. Of course, closer to the open position, the wind deflector does not contact the moveable panel at all and thus does not provide any force either.

Apart from braking force differences due to a mechanical structure, other conditions may affect the braking force as well. For example, a temperature affects the friction acting on the moveable panel. So, when driving in summer under the sun, the friction will be significantly different compared to driving in winter in the snow. Further, road conditions may provide for vibrations affecting a smooth travel of the moveable panel. Wear of the mechanical assembly may eventually also affect the friction and hence the braking force. Many other aspects may affect the braking force as well. In any case, the illustrated prior art method will regularly result in corrective movements of the moveable panel which may appear strange to a user and is therefore undesirable.

Figure 3:
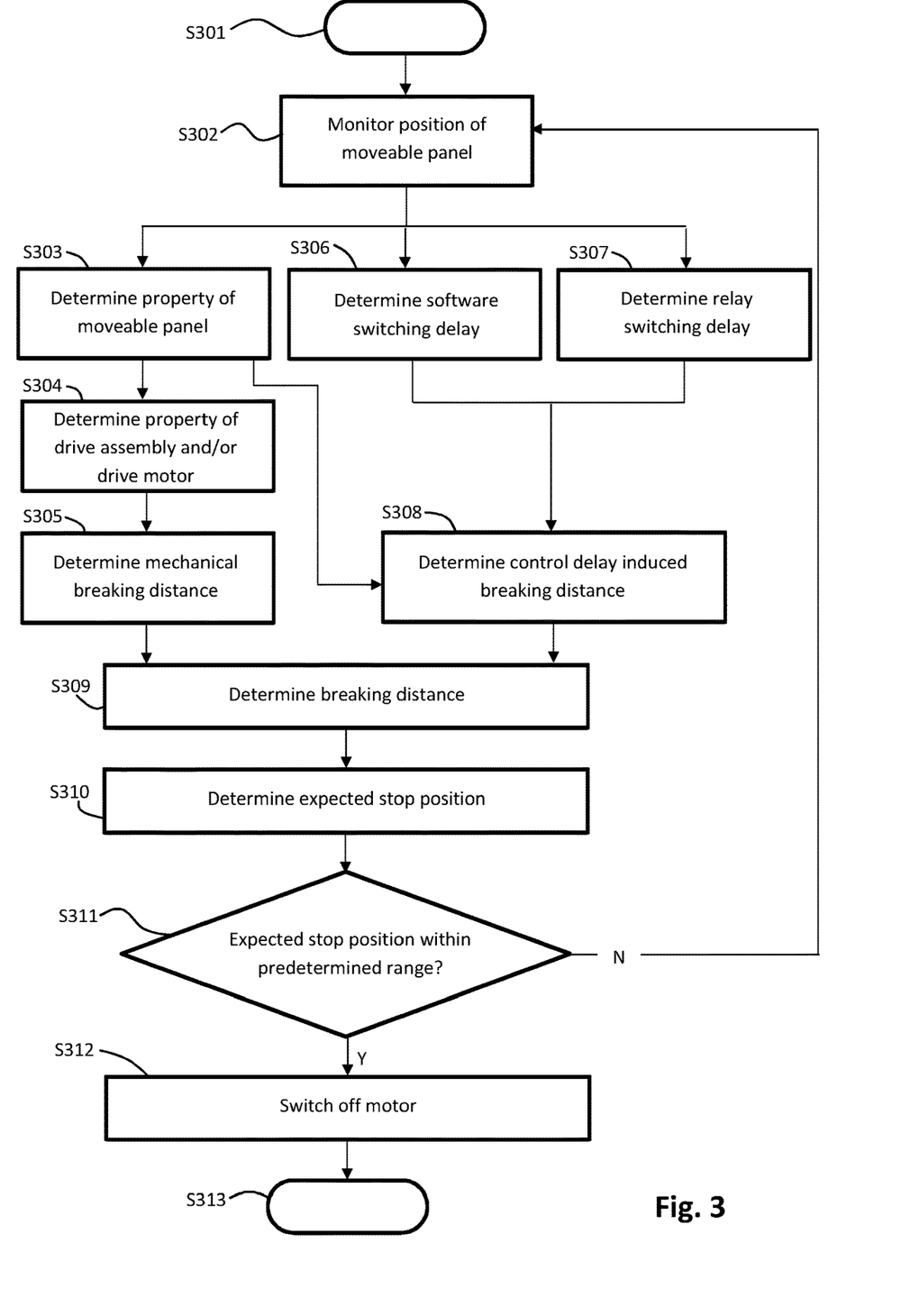
FIG. 3 shows a diagram illustrating a first embodiment of a control method.

FIG. 3 illustrates an embodiment of a positioning method in accordance with aspects of the present invention. Upon start S301, the moveable panel is brought into motion and its position is monitored in step S302. As mentioned in relation to FIG. 2, many different techniques and means may be applied for monitoring the position. The present invention is not limited to any specific technique or means for monitoring the position.

Steps S303, S304 and S305 are performed in accordance with the present invention. In particular, at least one property of the moving moveable panel is determined. For example, a weight of the moveable panel and an actual speed of the moveable panel may be determined in order to derive the momentum of the moving moveable panel. In step S304, at least one property of the drive assembly and/or the drive motor is determined. Such a property may be a directly relevant property, such as a friction force, for example. However, it may as well be an indirectly relevant property on the basis of which a relevant property may be derived, such as a material temperature from which an actual friction force may be derivable. In such embodiment, as many indirectly relevant properties may be taken into account in order to arrive at a high positioning accuracy.

In particular, the braking force may be considered to comprise a panel friction force and a motor friction force. An instant panel friction force value may be derived during motion from an actual speed and a drive current. The drive current is an electrical current supplied to the drive motor and determines a generated torque. Through the actual torque and the actual speed, the instant panel friction force may be calculated. It is noted that this calculation is known for use in detecting an obstruction. If the moveable panel is obstructed, the drive current will increase in order to increase the generated torque such to overcome the force exerted by the obstruction.

The motor friction force is a force that results when the drive current is removed, while due to inertia the moveable panel pulls on the drive cables and thus attempts to rotate a rotary motor shaft. The drive motor however resists due to electrical properties, as well known in the art, resulting in a counterforce. This counterforce is considered herein as a motor friction force. The motor friction force value may be dependent on the speed of the moving moveable panel.

In step S305 a mechanical braking force is determined as the sum of the panel braking force and the motor friction force. If, in an embodiment, the actual panel friction force and the motor friction force have been determined in step S304, a mechanical braking distance may be derived by $$s=(v^2 \cdot m)/2(F_{panel}+F_{motor}) \qquad (\text{eq. 1})$$

wherein s is the mechanical braking distance, v is the actual speed of the moveable panel, m is the mass of the moveable panel, $F_{panel}$ is the panel friction force and $F_{motor}$ is the motor friction force. It is however noted that Eq. 1 is applicable to a sliding movement of the moveable panel. If a tilting, rotating or any other movement is performed, another equation may be applicable. Determining the applicable equation is assumed to lie within the ambit of the person skilled in the relevant art.

In a first embodiment of the method according to the present invention, the method may then continue with step S309 and using the mechanical braking distance as the (total) braking distance. In another embodiment, however, further aspects affecting the braking distance may be taken into account.

For example, in the embodiment of FIG. 3, a software switching delay is taken into account in step S306. For processing a number of software method steps a certain processing time is needed. During this processing time, the moveable panel is moving. Similarly, for switching a relay to remove the drive current to the drive motor, a relay switching delay occurs, which relay switching delay is determined in step S307. Likewise, during this relay switching delay the moveable panel is moving. As a result, from the moment at which it is determined that the moveable panel is at the position that the drive motor needs to be switched off until the moment that the drive current is actually removed, during the software switching delay and the relay switching delay, the moveable panel has travelled a control delay induced braking distance, which is determined in step S308 on the basis of the delays determined in steps S306 and S307 and on the basis of the actual speed, which is determined in step S303. Of course, if any other delays are present in the control unit and/or the drive assembly, such delays may be taken into account in this step S308 as well.

Having determined the mechanical braking distance in step S305 and the control delay induced braking distance in step S308, a (total) braking distance is determined in step S309.

In a next step S310, the braking distance is added to the actual position as determined in step S302. In an embodiment, the position may as well be determined in this step S310 or directly preceding this step S310 instead of step S302 or in addition to step S302. The sum of the actual position and the braking distance provides an expected stop position, which is the position at which the moveable panel may be expected to come to a halt if it is decided, at that moment, to switch off the drive motor.

In step S311, the expected stop position is compared to the desired stop position and, in particular, it is determined whether the expected stop position is within a predetermined tolerance range relative to the desired stop position.

If the expected stop position is outside the predetermined range, the method continues with step S302. The relevant properties are determined again such to have all the actual, instant values available to ensure an accurate determination of the braking distance. These method steps are repeated until it is determined in step S311 that the expected stop position is within the predetermined range.

If the expected stop position is within the predetermined range, the method continues with step S312 and the drive motor is switched off. As the method has used the actual, instant properties of both moveable panel and the drive assembly and/or drive motor, the moveable panel will come to a halt at or very close to the desired stop position. No further verification of the actual stop position is required and there is no need to repeat any steps. The moveable panel is positioned and stopped without further corrective movements.

As discussed in relation to step S206, a predetermined tolerance range may be selected arbitrarily or on the basis of specific considerations and/or technical aspects. This is of course also applicable to the present invention. However, in the prior art method of FIG. 2, selecting a very small tolerance range, many or even an unlimited number of corrective movements will be performed in an attempt to position the moveable panel within the predetermined range. Due to the omission of the loop after stopping the moveable panel, such repeating movements are prevented. Still, selection of a very small tolerance range could proof unwise.

Figure 4:
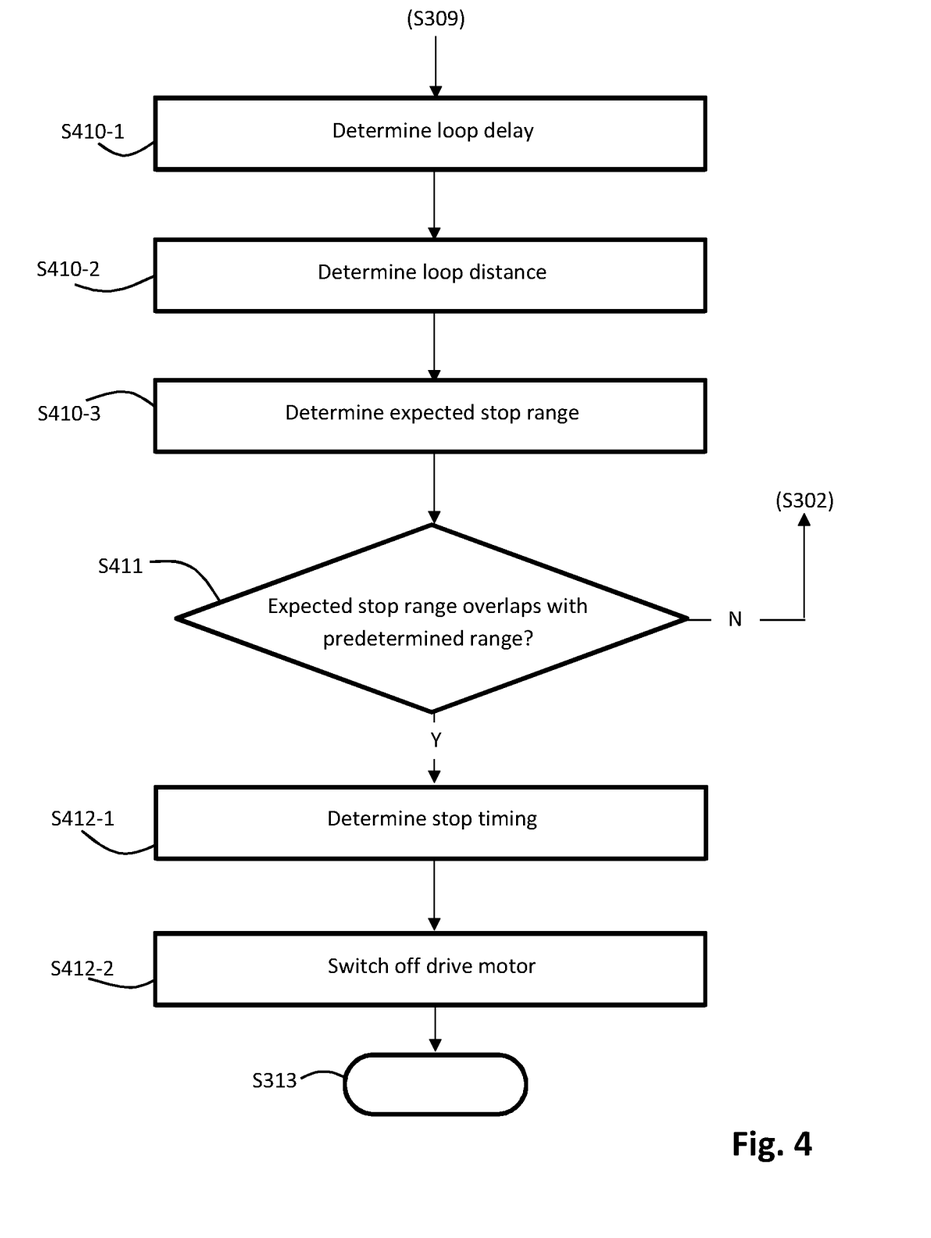
FIG. 4 shows a diagram illustrating a second embodiment of a control method.

In the method according to the present invention, the predetermined range is used to determine whether to re-determine the braking distance and a new expected stop position, or not. With a very small tolerance range and considering that re-determination requires time as well, it might be that the moveable panel is moved too far. If a highly accurate positioning is desirable, in an embodiment of the present invention, the method may be further improved. This improvement is illustrated in FIG. 4. In more detail, FIG. 4 illustrates a number of method steps replacing the steps S310—S312 in the embodiment of FIG. 3. Other steps may remain the same.

In the embodiment of FIG. 4, step S310 is replaced by steps S410-1—S410-3. In step S410-1, a loop delay is determined. The loop delay is the time needed for repeating the loop comprising the method steps S302—S309. Similar to the control delay induced braking distance, a loop delay distance is determined in step S410-2 by taking into account the actual speed of the moveable panel.

In step S410-3, the loop delay distance is used to establish an expected stop range, which corresponds to a range starting with the expected stop position as defined in step S310 and ending at an end position, which corresponds to the loop delay distance added to the expected stop position. Thus, the expected stop range corresponds to the trajectory that is expected to be travelled by the moveable panel if the above-mentioned loop is going to be performed. In other words, it is expected that the moveable panel will be at the above-mentioned end position when all the method steps in said loop have been performed.

In step S411, the expected stop range determined in step S410-3 is compared with the predetermined range. If there is sufficient overlap, in particular if the desired stop position is within the expected stop range, it is decided to continue with step S412-1. Otherwise, if there is no or insufficient overlap, i.e. said loop may be run again without overshooting the desired stop position, the method returns to step S302.

In step S412-1, a switch timing is determined. The switch timing corresponds to a timing at which it is expected that the moveable panel will halt at the desired stop position. So, as compared to the embodiment of FIG. 3, in this embodiment, the switching operation is not necessarily performed immediately, but may be postponed. Of course, in another embodiment, instead of mere timing, an actual position and a switch position may be used to determine an optimal switch timing.

At the determined switch timing, steps S412-2 is performed by switching off the drive motor.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques.

Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

The invention claimed is:

1. A method for positioning a movably arranged panel, wherein the moveable panel is operatively coupled through a drive assembly to a drive motor for moving the moveable panel, the method comprising:
 a—actuating the drive motor to move the moveable panel to a desired stop position;
 b—determining a panel braking distance based on a physical property of the moveable panel and a physical property of at least one of the drive assembly and the drive motor, wherein the panel braking distance corresponds to a distance covered by the moveable panel in a period of time starting from a decision to switch off the drive motor until stand-still of the moveable panel;
 c—determining an actual position of the moveable panel;
 d—determining an expected stop position by adding the panel braking distance and the present position; and
 e—switching off the drive motor if the expected stop position is within a predetermined range around the desired stop position and repeating steps b, c and d if the expected stop position is outside said predetermined range.

2. The method according to claim 1, wherein step b comprises:
 b1—determining a speed of movement of the moveable panel; and further comprises at least one of the steps of:
 b2—determining a mechanical leg braking distance based on said speed, wherein the mechanical braking distance corresponds to a distance travelled by the moveable panel after removing a drive current to the drive motor; and
 b3—determining a control delay induced braking distance based on said speed, wherein the control delay induced distance corresponds to a distance travelled by the moveable panel in a processing period between a decision to switch off the drive motor and actual removal of the drive current to the drive motor.

3. The method according to claim 2, wherein the method is performed by a controller and the processing period comprises a predetermined processing delay in the controller.

4. The method according to claim 2, wherein the drive current is removed by operating a relay and wherein the processing period comprises a predetermined processing delay for switching the relay.

5. The method according to claim 2, wherein step b2 comprises determining an instant panel friction value, wherein the friction value corresponds to friction in a drive assembly, which drive assembly mechanically couples the moveable panel and the drive motor.

6. The method according to claim 2, wherein step b2 comprises taking into account a motor friction value, and wherein the motor friction value corresponds to friction induced by the drive motor when no drive current is supplied to the drive motor.

7. The method according to claim 1, wherein the moveable panel is slidable between a first position and a second position, and wherein the panel braking distance is calculated taking into account an actual slide speed.

8. The method according to claim 1, wherein the moveable panel is moveable to a tilt position, and wherein the panel braking distance is calculated taking into account an actual tilting speed.

9. The method according to claim 1, wherein a control loop time corresponds to a period of time for performing steps b, c and d and wherein the method comprises a further step f, performed prior to step e, of determining said predetermined range based on the control loop time and the instant speed of the moveable panel.

10. The method according to claim 9, wherein the predetermined range extends between a first range end position and a second range end position and wherein the first range end position is determined based on the control loop time and the instant speed of the moveable panel and the second range end position corresponds to the desired stop position; and
 wherein step e comprises determining a timing for switching off the drive motor if the expected stop position is within the predetermined range.

11. The sunroof panel assembly comprising a moveably arranged panel, a drive motor operatively coupled to the moveable panel for moving the moveable panel and a controller operatively coupled to the drive motor for operating the drive motor, wherein the controller is configured for performing a method for controlling the drive motor comprising:
 a—actuating the drive motor to move the moveable panel to a desired stop position;
 b—determining a panel braking distance based on a physical property of the moveable panel and a physical property of at least one of the drive assembly and the drive motor, wherein the panel braking distance corresponds to a distance covered by the moveable panel in a period of time starting from a decision to switch off the drive motor until stand-still of the moveable panel;

c—determining an actual position of the moveable panel;

d—determining an expected stop position by adding the panel braking distance and the present position; and e—switching off the drive motor if the expected stop position is within a predetermined range around the desired stop position and repeating steps b, c and d if the expected stop position is outside said predetermined range.

12. The sunroof panel assembly according to claim 11 and further comprising a vehicle having a roof with a roof opening, the sunroof panel assembly being disposed in the roof, and the movable panel configured to open and close the roof opening at least partially.

13. The sunroof panel assembly according claim 11, wherein the controller is configured for at step b:

b1—determining a speed of movement of the moveable panel; and further comprises at least one of the steps of:

b2—determining a mechanical braking distance based on said speed, wherein the mechanical braking distance corresponds to a distance travelled by the moveable panel after removing a drive current to the drive motor; and b3—determining a control delay induced braking distance based on said speed, wherein the control delay induced distance corresponds to a distance travelled by the moveable panel in a processing period between a decision to switch off the drive motor and actual removal of the drive current to the drive motor.

14. The sunroof panel assembly according claim 11, wherein the controller is configured such that step b2 comprises determining an instant panel friction value, wherein the friction value corresponds to friction in a drive assembly in which the drive assembly mechanically couples the moveable panel and the drive motor.

15. The sunroof panel assembly according to claim 11, wherein the controller is configured such that step b2 comprises taking into account a motor friction value, wherein the motor friction value corresponds to friction induced by the drive motor when no drive current is supplied to the drive motor.

16. A non-transitory computer readable medium carrying computer readable instructions for instructing a computer to control a drive motor operatively coupled to a drive assembly for moving the moveable panel, the method comprising:

a—actuating the drive motor to move the moveable panel to a desired stop position;

b—determining a panel braking distance based on a physical property of the moveable panel and a physical property of at least one of the drive assembly and the drive motor, wherein the panel braking distance corresponds to a distance covered by the moveable panel in a period of time starting from a decision to switch off the drive motor until stand-still of the moveable panel;

c—determining an actual position of the moveable panel;

d—determining an expected stop position by adding the panel braking distance and the present position; and e—switching off the drive motor if the expected stop position is within a predetermined range around the desired stop position and repeating steps b, c and d if the expected stop position is outside said predetermined range.

17. The non-transitory computer readable medium carrying computer readable instructions according to claim 16, wherein the moveable panel is slidable between a first position and a second position, and wherein the panel braking distance is calculated taking into account an actual slide speed.

18. The non-transitory computer readable medium carrying computer readable instructions according to claim 16, wherein the moveable panel is moveable to a tilt position, and wherein the panel braking distance is calculated taking into account an actual tilting speed.

19. The non-transitory computer readable medium carrying computer readable instructions according to claim 16, wherein a control loop time corresponds to a period of time for performing steps b, c and d and wherein the method comprises a further step f, performed prior to step e, of determining said predetermined range based on the control loop time and the instant speed of the moveable panel.

20. The non-transitory computer readable medium carrying computer readable instructions according to claim 19, wherein the predetermined range extends between a first range end position and a second range end position and wherein the first range end position is determined based on the control loop time and the instant speed of the moveable panel and the second range end position corresponds to the desired stop position; and wherein step e comprises determining a timing for switching off the drive motor if the expected stop position is within the predetermined range.

\* \* \* \* \*